US012347973B2

(12) United States Patent
Keith et al.

(10) Patent No.: US 12,347,973 B2
(45) Date of Patent: Jul. 1, 2025

(54) CONNECTORS FOR A SINGLE TWISTED PAIR OF CONDUCTORS

(71) Applicant: COMMSCOPE TECHNOLOGIES LLC, Hickory, NC (US)

(72) Inventors: Scott Martin Keith, Plano, TX (US); Amid Ihsan Hashim, Plano, TX (US); Bryan Scott Moffitt, Red Bank, NJ (US); Shawn Phillip Tobey, Trinity, NC (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/317,345

(22) Filed: May 15, 2023

(65) Prior Publication Data

US 2023/0402792 A1 Dec. 14, 2023

Related U.S. Application Data

(63) Continuation of application No. 16/608,126, filed as application No. PCT/US2018/029146 on Apr. 24, 2018, now Pat. No. 11,652,322.

(Continued)

(51) Int. Cl.
*H01R 13/6463* (2011.01)
*H01R 13/502* (2006.01)

(Continued)

(52) U.S. Cl.
CPC ....... *H01R 13/6463* (2013.01); *H01R 13/502* (2013.01); *H01R 13/64* (2013.01); *H01R 31/06* (2013.01)

(58) Field of Classification Search
CPC .. H01R 13/6463; H01R 13/502; H01R 13/64; H01R 31/06
See application file for complete search history.

(56) References Cited

U.S. PATENT DOCUMENTS 2,673,968 A 3/1954 Smith
2,813,257 A 11/1957 Cornell, Jr.

(Continued)

FOREIGN PATENT DOCUMENTS

CN 1408135 A 4/2003
CN 1977428 A 6/2007

(Continued)

OTHER PUBLICATIONS

Bapat, "On the design and analysis of compliant mechanisms using the pseudo-rigid-body model concept." Retrieved from the Internet: <https://scholarsmine.mst.edu/cgi/viewcontent.cgi?article=3378&context-doctoral_dissertations>. Doctoral Dissertation, Missouri University of Science and Technology, 295 pages (2015).

(Continued)

*Primary Examiner* — Thanh Tam T Le
(74) *Attorney, Agent, or Firm* — Merchant & Gould P.C.

(57) ABSTRACT

A family of connectors to accommodate a single twisted pair of conductors is disclosed herein. The family of connectors includes a free connector, a fixed connector, and an adapter; the free and/or fixed connectors can be modified to accommodate the adapter configuration and/or modified to accommodate various patch cord configurations. In certain embodiments, the one or more of the family of connectors adopts an LC fiber optic style connector configuration and an LC fiber optic footprint configuration. In certain examples, one or more of the family of connectors adopts an LC fiber optic style connector configuration but in a footprint that is larger or smaller than the footprint of the LC fiber optic footprint. Other configurations may also be adopted.

10 Claims, 10 Drawing Sheets

Related U.S. Application Data

(60) Provisional application No. 62/635,227, filed on Feb. 26, 2018, provisional application No. 62/489,164, filed on Apr. 24, 2017.

(51) Int. Cl.
*H01R 13/64* (2006.01)
*H01R 31/06* (2006.01)

(56) References Cited

U.S. PATENT DOCUMENTS

| | | | |
|---|---|---|---|
| 3,199,060 | A | 8/1965 | Marasco |
| 3,827,007 | A | 7/1974 | Fairbairn et al. |
| 3,828,706 | A | 8/1974 | Scott |
| 4,054,350 | A | 10/1977 | Hardesty |
| 4,449,767 | A | 5/1984 | Weidler |
| 4,458,971 | A | 7/1984 | D'Urso et al. |
| 4,565,416 | A | 1/1986 | Rudy et al. |
| 4,702,538 | A | 10/1987 | Hutter et al. |
| 4,743,208 | A | 5/1988 | Weisenburger |
| 4,744,774 | A | 5/1988 | Pauza |
| 4,824,196 | A | 4/1989 | Bylander |
| 4,824,394 | A | 4/1989 | Roath et al. |
| 4,917,625 | A | 4/1990 | Haile |
| 4,932,906 | A | 6/1990 | Kaley et al. |
| 5,013,255 | A | 5/1991 | Juret et al. |
| 5,014,407 | A | 5/1991 | Boughten et al. |
| 5,240,436 | A | 8/1993 | Bradley et al. |
| 5,317,663 | A | 5/1994 | Beard et al. |
| 5,368,499 | A | 11/1994 | Hirt |
| 5,385,476 | A | 1/1995 | Jasper |
| 5,496,184 | A | 3/1996 | Garrett et al. |
| 5,504,654 | A | 4/1996 | Knox et al. |
| 5,533,915 | A | 7/1996 | Deans |
| 5,580,264 | A | 12/1996 | Aoyama et al. |
| 5,647,119 | A | 7/1997 | Bourbeau et al. |
| 5,692,080 | A | 11/1997 | Lu |
| 5,732,174 | A | 3/1998 | Carpenter et al. |
| 5,748,819 | A | 5/1998 | Szentesi et al. |
| 5,749,755 | A | 5/1998 | Genta et al. |
| 5,833,496 | A | 11/1998 | Hollander et al. |
| 5,897,404 | A | 4/1999 | Goodman et al. |
| 5,915,989 | A | 6/1999 | Adriaenssens et al. |
| 5,984,703 | A | 11/1999 | Weingartner |
| 5,989,057 | A | 11/1999 | Gerke et al. |
| 6,019,521 | A | 2/2000 | Manning et al. |
| 6,045,389 | A | 4/2000 | Ferrill et al. |
| 6,050,845 | A | 4/2000 | Smalley, Jr. et al. |
| 6,065,994 | A | 5/2000 | Hashim et al. |
| 6,135,804 | A | 10/2000 | Lux |
| 6,217,230 | B1 | 4/2001 | Matsushita |
| 6,254,440 | B1 | 7/2001 | Ko et al. |
| 6,270,372 | B1 | 8/2001 | Jenner et al. |
| 6,272,738 | B1 | 8/2001 | Holliday et al. |
| 6,280,230 | B1 | 8/2001 | Takase et al. |
| 6,305,950 | B1 | 10/2001 | Doorhy |
| 6,390,687 | B1 | 5/2002 | Shirakawa |
| 6,402,571 | B1 | 6/2002 | Muller et al. |
| 6,410,845 | B2 | 6/2002 | Reede |
| 6,488,550 | B1 | 12/2002 | Kikuchi et al. |
| 6,499,889 | B1 | 12/2002 | Shirakawa et al. |
| 6,568,967 | B2 | 5/2003 | Inaba et al. |
| 6,572,276 | B1 | 6/2003 | Theis et al. |
| 6,641,431 | B2 | 11/2003 | Saitoh |
| 6,648,673 | B2 | 11/2003 | Watanabe |
| 6,702,617 | B1 | 3/2004 | Clement et al. |
| 6,729,901 | B2 | 5/2004 | Aekins |
| 6,805,577 | B2 | 10/2004 | Murakami et al. |
| 6,988,914 | B2 | 1/2006 | Pepe et al. |
| 7,004,797 | B2 | 2/2006 | Harada et al. |
| 7,118,423 | B2 | 10/2006 | Kobayashi et al. |
| 7,201,601 | B2 | 4/2007 | Lappohn |
| 7,217,162 | B2 | 5/2007 | Harada et al. |
| 7,278,854 | B1 | 10/2007 | Robinette et al. |
| 7,291,046 | B2 | 11/2007 | Russelburg |
| 7,294,024 | B2 | 11/2007 | Hammond, Jr. et al. |
| 7,318,272 | B1 | 1/2008 | Steiner et al. |
| 7,325,976 | B2 | 2/2008 | Gurreri et al. |
| 7,537,393 | B2 | 5/2009 | Anderson et al. |
| 7,559,789 | B2 | 7/2009 | Hashim |
| 7,618,262 | B2 | 11/2009 | Fogg et al. |
| 7,618,297 | B2 | 11/2009 | Wang |
| 7,690,941 | B2 | 4/2010 | Caveney et al. |
| 7,867,033 | B2 | 1/2011 | Kumagai et al. |
| 7,909,622 | B2 | 1/2011 | Pepe et al. |
| 7,955,112 | B2 | 6/2011 | Yang et al. |
| 8,006,372 | B2 | 8/2011 | Caveney et al. |
| 8,052,482 | B1 | 11/2011 | Lin |
| 8,109,789 | B2 | 2/2012 | Tyler |
| 8,113,889 | B2 | 2/2012 | Zhang et al. |
| 8,172,468 | B2 | 5/2012 | Jones et al. |
| 8,303,337 | B2 | 11/2012 | Ballard et al. |
| 8,382,382 | B2 * | 2/2013 | Nelson .................. G02B 6/381 385/59 |
| 8,454,378 | B2 | 6/2013 | Osterhart et al. |
| 8,684,763 | B2 | 4/2014 | Mattson et al. |
| 8,690,596 | B2 | 4/2014 | Su et al. |
| 8,715,016 | B2 | 5/2014 | DeBock et al. |
| 8,757,895 | B2 | 6/2014 | Petersen |
| 8,821,031 | B2 * | 9/2014 | Lin ..................... G02B 6/3849 385/59 |
| 8,839,506 | B2 | 9/2014 | Slater et al. |
| 8,840,424 | B2 | 9/2014 | Kudo |
| 8,888,535 | B2 | 11/2014 | Knight et al. |
| 8,911,260 | B2 | 12/2014 | Golko et al. |
| 8,915,759 | B2 | 12/2014 | Miyamoto |
| 8,952,703 | B2 | 2/2015 | Font Aranega et al. |
| 8,979,572 | B2 | 3/2015 | Mochizuki |
| 8,979,574 | B2 | 3/2015 | Daily, Jr. et al. |
| 8,987,933 | B2 | 3/2015 | Yu |
| 9,077,106 | B2 | 7/2015 | Suzuki |
| 9,093,807 | B2 | 7/2015 | O'Connor et al. |
| 9,112,293 | B2 | 8/2015 | Suzuki |
| 9,136,652 | B2 | 9/2015 | Ngo |
| 9,172,169 | B2 | 10/2015 | Hagio et al. |
| 9,209,578 | B2 | 12/2015 | Mochizuki |
| 9,293,877 | B2 | 3/2016 | Wong et al. |
| 9,306,313 | B2 | 4/2016 | Heggemann et al. |
| 9,343,822 | B2 | 5/2016 | Sparrowhawk et al. |
| 9,356,439 | B2 | 5/2016 | Keith et al. |
| 9,366,829 | B2 * | 6/2016 | Czosnowski ........ G02B 6/3879 |
| 9,407,043 | B2 | 8/2016 | Hashim et al. |
| 9,490,591 | B2 | 11/2016 | Yamashita et al. |
| 9,590,339 | B2 | 3/2017 | Oberski et al. |
| 9,599,776 | B2 * | 3/2017 | Shimakawa ......... G02B 6/3825 |
| 9,634,417 | B2 * | 4/2017 | Ramanna ............. H01R 13/432 |
| 9,685,726 | B2 | 6/2017 | Ang et al. |
| 9,692,161 | B2 | 6/2017 | Lindkamp et al. |
| 9,799,981 | B2 | 10/2017 | Weber |
| 9,853,388 | B2 | 12/2017 | Copper et al. |
| 9,917,390 | B1 | 3/2018 | Bianca et al. |
| 9,972,932 | B2 | 5/2018 | Copper et al. |
| 10,061,090 | B2 | 8/2018 | Coenegracht |
| 10,069,269 | B2 | 9/2018 | Takahashi |
| 10,164,383 | B2 | 12/2018 | Feng |
| 10,389,062 | B2 | 8/2019 | Zebhauser et al. |
| 10,403,996 | B2 | 9/2019 | Pan et al. |
| 10,411,409 | B2 | 9/2019 | Hashim et al. |
| 10,502,904 | B2 * | 12/2019 | Yang .................... G02B 6/3825 |
| 10,535,969 | B2 | 1/2020 | Sutter |
| 10,665,974 | B2 | 5/2020 | Oberski et al. |
| 10,665,985 | B2 | 5/2020 | Keith et al. |
| 10,727,626 | B2 | 7/2020 | Murray |
| 10,768,374 | B2 * | 9/2020 | Gurreri ................ G02B 6/3869 |
| 10,950,962 | B2 | 3/2021 | Schmidbauer et al. |
| 10,998,685 | B2 | 5/2021 | Curtis et al. |
| 11,031,719 | B2 | 6/2021 | Somanathapura Ramanna |
| 11,271,350 | B2 | 3/2022 | Moffitt et al. |
| 11,296,463 | B2 | 4/2022 | Keith et al. |
| 11,362,463 | B2 | 6/2022 | Tobey et al. |
| 11,394,132 | B2 * | 7/2022 | Ohfuku .................. H01R 4/185 |
| 11,652,319 | B2 | 5/2023 | Pepe et al. |
| 11,652,322 | B2 | 5/2023 | Keith et al. |
| 2001/0018287 | A1 | 8/2001 | Reichle |

(56) References Cited

U.S. PATENT DOCUMENTS

| | | | |
|---|---|---|---|
| 2002/0055294 | A1 | 5/2002 | Murakami et al. |
| 2002/0072275 | A1 | 6/2002 | Arai |
| 2002/0151224 | A1 | 10/2002 | Liao |
| 2003/0017740 | A1 | 1/2003 | Watanabe |
| 2004/0152360 | A1 | 8/2004 | Harris et al. |
| 2004/0266255 | A1 | 12/2004 | Lee |
| 2005/0227545 | A1 | 10/2005 | Lahoreau et al. |
| 2005/0232566 | A1 | 10/2005 | Rapp et al. |
| 2005/0277335 | A1 | 12/2005 | Gordon et al. |
| 2006/0116021 | A1 | 6/2006 | Dennes et al. |
| 2006/0134966 | A1 | 6/2006 | Lappohn |
| 2006/0189215 | A1 | 8/2006 | Ellis et al. |
| 2007/0270043 | A1 | 11/2007 | Pepe et al. |
| 2007/0287332 | A1 | 12/2007 | Gordon et al. |
| 2008/0057793 | A1 | 3/2008 | Gerber et al. |
| 2008/0183359 | A1 | 8/2008 | Gerber et al. |
| 2009/0149061 | A1 | 6/2009 | Zhang |
| 2009/0176415 | A1 | 7/2009 | AbuGhazaleh et al. |
| 2010/0003863 | A1 | 1/2010 | Siemon et al. |
| 2010/0022112 | A1 | 1/2010 | Duesterhoeft et al. |
| 2010/0035454 | A1 | 2/2010 | Morgan et al. |
| 2010/0040332 | A1 | 2/2010 | Van Den Meersschaut et al. |
| 2010/0041273 | A1 | 2/2010 | Scherer et al. |
| 2010/0071202 | A1 | 3/2010 | Peng et al. |
| 2010/0120284 | A1 | 5/2010 | Oka et al. |
| 2010/0151740 | A1 | 6/2010 | Hogue et al. |
| 2010/0173528 | A1 | 7/2010 | Martich et al. |
| 2010/0221951 | A1 | 9/2010 | Pepe et al. |
| 2010/0304600 | A1 | 12/2010 | Busse |
| 2010/0319963 | A1 | 12/2010 | James et al. |
| 2011/0143602 | A1 | 6/2011 | Niitsu |
| 2011/0294342 | A1 | 12/2011 | DeBock et al. |
| 2012/0004655 | A1 | 1/2012 | Kim et al. |
| 2012/0204417 | A1 | 8/2012 | Stull |
| 2013/0075149 | A1 | 3/2013 | Golko et al. |
| 2013/0090014 | A1 | 4/2013 | Champion |
| 2013/0171885 | A1 | 7/2013 | Zhang |
| 2013/0189873 | A1 | 7/2013 | Maranto et al. |
| 2013/0252469 | A1 | 9/2013 | Mochizuki |
| 2013/0252483 | A1 | 9/2013 | Mochizuki |
| 2013/0288516 | A1 | 10/2013 | Chang et al. |
| 2014/0038462 | A1 | 2/2014 | Coffey et al. |
| 2014/0213119 | A1 | 7/2014 | Thackston et al. |
| 2015/0083455 | A1 | 3/2015 | Keith et al. |
| 2015/0144395 | A1 | 5/2015 | Tanaka |
| 2015/0155670 | A1 | 6/2015 | Gardner |
| 2015/0207254 | A1 | 7/2015 | Kamei et al. |
| 2015/0214667 | A1 | 7/2015 | Chen et al. |
| 2015/0249295 | A1 | 9/2015 | Tseng |
| 2015/0311646 | A1 | 10/2015 | Bopp et al. |
| 2016/0028198 | A1 | 1/2016 | Yamashita et al. |
| 2016/0093984 | A1 | 3/2016 | Iwamoto |
| 2016/0131858 | A1 | 5/2016 | Anderson et al. |
| 2016/0164223 | A1 | 6/2016 | Zebhauser et al. |
| 2016/0192527 | A1 | 6/2016 | Anderson et al. |
| 2016/0294111 | A1 | 10/2016 | Kobayashi et al. |
| 2016/0315436 | A1 | 10/2016 | Plamondon et al. |
| 2016/0344139 | A1 | 11/2016 | O'Young et al. |
| 2017/0077966 | A1 | 3/2017 | Chen et al. |
| 2017/0184798 | A1 | 6/2017 | Coenegracht |
| 2017/0207561 | A1 | 7/2017 | Scherer et al. |
| 2017/0264025 | A1 | 9/2017 | Lappöhn |
| 2017/0322378 | A1 | 11/2017 | Declerck et al. |
| 2017/0373405 | A1 | 12/2017 | Lappoehn |
| 2019/0154923 | A1 | 5/2019 | Flaig |
| 2019/0296491 | A1 | 9/2019 | Maesoba et al. |
| 2020/0036130 | A1 | 1/2020 | Fontaine et al. |
| 2020/0106216 | A1 | 4/2020 | Hashim et al. |
| 2020/0153174 | A1 | 5/2020 | Curtis et al. |
| 2020/0274273 | A1 | 8/2020 | Oberski et al. |
| 2020/0350730 | A1 | 11/2020 | Keith et al. |
| 2021/0083441 | A1 | 3/2021 | Moffitt et al. |
| 2021/0104843 | A1 | 4/2021 | Tobey et al. |
| 2021/0151905 | A1 | 5/2021 | Novak et al. |
| 2021/0194179 | A1 | 6/2021 | Pepe et al. |
| 2021/0378834 | A1 | 12/2021 | Kleiner |
| 2022/0158389 | A1 | 5/2022 | Pepe et al. |
| 2022/0360033 | A1 | 11/2022 | Pepe et al. |
| 2022/0384984 | A1 | 12/2022 | Pepe et al. |
| 2023/0071501 | A1 | 3/2023 | Tobey et al. |
| 2023/0238757 | A1 | 7/2023 | Pepe et al. |

FOREIGN PATENT DOCUMENTS

| | | | |
|---|---|---|---|
| CN | 102055115 | A | 5/2011 |
| CN | 102136649 | A | 7/2011 |
| CN | 103311746 | A | 9/2013 |
| CN | 104428958 | A | 3/2015 |
| CN | 105789965 | A | 7/2016 |
| CN | 106415944 | A | 2/2017 |
| CN | 107104329 | A | 8/2017 |
| CN | 209167592 | U | 7/2019 |
| DE | 10216915 | A1 | 10/2003 |
| EP | 1 128 494 | A2 | 8/2001 |
| EP | 1 783 871 | A1 | 5/2007 |
| EP | 2862364 | | 5/2016 |
| EP | 3 091 614 | A1 | 11/2016 |
| FR | 2 290 136 | A7 | 5/1976 |
| GB | 628 419 | A | 8/1949 |
| GB | 2510490 | A | 8/2014 |
| JP | 2004-319196 | A | 11/2004 |
| JP | 4514356 | B2 | 5/2010 |
| JP | 2014-38847 | A | 2/2014 |
| KR | 10-2010-0122766 | A | 11/2010 |
| KR | 10-2011-0020262 | A | 3/2011 |
| WO | 2006/048867 | A1 | 5/2006 |
| WO | 2011/163260 | A1 | 12/2011 |
| WO | 2016/132855 | A1 | 8/2016 |
| WO | 2017/019370 | A1 | 2/2017 |
| WO | 2017/152108 | A1 | 9/2017 |
| WO | 2018/227057 | A1 | 12/2018 |
| WO | 2018/236875 | A1 | 12/2018 |
| WO | 2019/147774 | A1 | 8/2019 |
| WO | 2019/165466 | A1 | 8/2019 |
| WO | 2020/051340 | A1 | 3/2020 |
| WO | 2020/190758 | A1 | 9/2020 |
| WO | 2021/067274 | A1 | 4/2021 |
| WO | 2021/252938 | A1 | 12/2021 |

OTHER PUBLICATIONS

Office Action from Chinese Application No. 201980023438.2 dated Jun. 3, 2021, 19 pages [English translation].

Office Action from Chinese Application No. 202080020977.3 dated Apr. 28, 2023, 15 pages (English Translation).

DiBiaso et al., "Designing a Connection System for Gigabit Automotive Ethernet," SAE International Journal of Passenger Cars—Electronic and Electrical Systems, vol. 9, No. 1, pp. 134-146 (May 2016).

Extended European Search Report for Application No. 18791421.3 dated Oct. 8, 2020.

Extended European Search Report for Application No. 19758304.0 dated Mar. 11, 2022.

Extended European Search Report for Application No. 20774495.4 dated Nov. 10, 2022.

Her, "Methodology for Compliant Mechanisms Design" Thesis, Purdue University, 196 pages (Dec. 1986).

International Search Report and Written Opinion of the International Searching Authority for International Patent Application No. PCT/US2018/029146 dated Aug. 9, 2018, 12 pages.

International Search Report and Written Opinion of the International Searching Authority for International Patent Application No. PCT/US2019/019660 dated Jun. 19, 2019, 17 pages.

International Search Report and Written Opinion for International Patent Application No. PCT/US2020/022731 dated Jul. 13, 2020, 9 pages.

Office Action in European Application No. 18791421.3 dated Nov. 30, 2021.

Koli, "A generalized approach for compliant mechanism design using the synthesis with compliance method, with experimental

(56) References Cited

OTHER PUBLICATIONS validation." Retrieved from the Internet: <URL: https://scholarsmine.mst.edu/cgi/viewcontent.cgi?article=8098&context=masters_theses>. Masters Thesis, Missouri University of Science and Technology, 155 pages (2013).

U.S. Non-Final Office Action for U.S. Appl. No. 15/931,046 dated Jul. 19, 2021.

U.S. Non-Final Office Action for U.S. Appl. No. 16/081,595 dated Jul. 21, 2021.

U.S. Non-Final Office Action for U.S. Appl. No. 16/964,730 dated Jul. 28, 2021.

U.S. Non-Final Office Action for U.S. Appl. No. 16/608,126 dated Dec. 29, 2021.

U.S. Final Office Action for U.S. Appl. No. 15/931,046 dated Jan. 19, 2022.

2-Pin Connector w/Header, .10", All Electronics Corporation, 3 pages, downloaded: http://www.allelctronics.com/item/con-242/2-pin-connector-w/header-.10/html (May 31, 2017).

2 Pin Connectors, Wiring Specialties, 5 pages (May 31, 2017).

* cited by examiner

CONNECTORS FOR A SINGLE TWISTED PAIR OF CONDUCTORS

CROSS-REFERENCE TO RELATED APPLICATIONS

This application is a Continuation of U.S. patent application Ser. No. 16/608,126, filed Oct. 24, 2019, now U.S. Pat. No. 11,652,322; which is a National Stage Application of PCT/US2018/029146, filed Apr. 24, 2018; which claims the benefit of U.S. Patent Application No. 62/489,164, filed Apr. 24, 2017; and claims the benefit of U.S. Patent Application No. 62/635,227, filed Feb. 26, 2018, the disclosures of which are incorporated herein by reference in their entireties. To the extent appropriate, a claim of priority is made to each of the above disclosed applications

TECHNICAL FIELD

The present disclosure is directed to connectors and, more specifically, to connectors for use with a single-twisted pair of conductors.

BACKGROUND

A single twisted pair of conductors can be used to transmit data and/or power over a communications network that includes, for example, computers, servers, cameras, televisions, and other electronic devices including those on the internet of things (IoT), etc. In the past, this has been performed through use of Ethernet cables and connectors which typically include four pairs of conductors that are used to transmit four differential signals. Differential signaling techniques, where each signal is transmitted over a balanced pair of conductors, are used because differential signals may be impacted less by external noise sources and internal noises sources such as crosstalk as compared to signals that are transmitted over unbalanced conductors.

In Ethernet cables, the insulated conductors of each differential pair are tightly twisted about each other to form four twisted pairs of conductors, and these four twisted pairs may be further twisted about each other in a so-called "core twist." A separator may be provided that is used to separate (and hence reduce coupling between) at least one of the twisted pairs from at least one other of the twisted pairs. The four twisted pairs and any separator may be enclosed in a protective jacket. Ethernet cables are connectorized with Ethernet connectors; a single Ethernet connector is configured to accommodate all four twisted pairs of conductors. However, it is possible that data and/or power transfer can be effectively supported through a singled twisted pair of conductors with its own more compact connector and cable. Accordingly, a connector design different from a standard Ethernet connector is needed.

SUMMARY

A family of connectors to accommodate a single twisted pair of conductors is disclosed herein. The family of connectors includes a free connector, a fixed connector, and an adapter; the free and/or fixed connectors can be modified to accommodate the adapter configuration and/or modified to accommodate various patch cord configurations. In certain embodiments, the one or more of the family of connectors adopts an LC fiber optic style connector configuration and an LC fiber optic footprint configuration. In certain examples, one or more of the family of connectors adopts an LC fiber optic style connector configuration but in a footprint that is larger or smaller than the footprint of the LC fiber optic footprint. Other configurations may also be adopted.

An aspect of the present disclosure is directed to a connector. The connector, for example a free connector, for a single twisted pair of conductors includes an LC style fiber optic connector housing, a connector insert that is receivable within connector housing, and first and second socket contacts. The first and second socket contacts are receivable within first and second channels of the connector insert. The first and second channels place the first and second socket contacts in an offset orientation. The first and second contacts are configured to be coupled to first and second conductors of a single twisted pair of conductors.

Another aspect of the present disclosure is directed to a different connector. This connector, for example a fixed connector, for a single twisted pair of conductors includes a body portion having a port, a panel, and first and second pin contacts. The panel has a first face and a second face, and is mechanically coupleable to the body portion. The first and second pin contacts each have a first portion that is received in respective first and second pin channels that are defined in the body portion; the first portion of the pin contacts extends into the port. The first and second pin contacts have a second portion outside the pin channels. The second portion is fixed in position relative to the body portion by a stabilizing feature that extends from the first face of the panel when the panel is mechanically coupled to the body portion. The second portions can be crossed, e.g. include one or more twists. The first and second pin channels place the first portions of the first and second pin contacts in an offset orientation.

Another aspect of the present disclosure is directed to an adapter. The adapter for coupling two single twisted pair of conductors includes a body portion having a first and second port, a panel, and a single twisted pair of conductors. The panel has a first and second face, and is mechanically coupled to the body portion. Each of the conductors of the single twisted pair has a first end comprising a pin contact and a second end comprising a pin contact. The pin contacts of the first ends are received within offset corresponding pin channels defined in the body portion and extend into the first port. The pin contacts of the second ends are received within offset corresponding pin channels defined in the body portion and extend into the second port. A twisted portion of the pair of conductors, which is intermediate the first and second ends, lies within the body portion. A stabilizing feature extending from a first face of the panel stabilizes the position of the pin contacts relative to the body portion when the panel is mechanically coupled to the body portion.

Still another aspect of the present disclosure is directed to a patch cord. The patch cord includes a twisted pair of conductors. The twisted pair of conductors can be connectorized at each end by a free connector, connectorized at each end by a fixed connector modified to patch cord configuration, or connectorized at a first end by a free connector and at a second end by a fixed connector modified to a patch cord configuration.

DETAILED DESCRIPTION

A family of connectors to accommodate a single twisted pair of conductors is disclosed herein. The family of connectors includes a free connector, a fixed connector, and an adapter; the free and/or fixed connectors can be modified to accommodate various patch cord and mounting configurations. In certain embodiments, the one or more of the family of connectors adopts an LC fiber optic style connector configuration and an LC fiber optic footprint configuration. In certain examples, one or more of the family of connectors adopts an LC fiber optic style connector configuration but in a footprint that is larger or smaller than the footprint of the LC fiber optic footprint. Other configurations may also be adopted.

Figure 1:
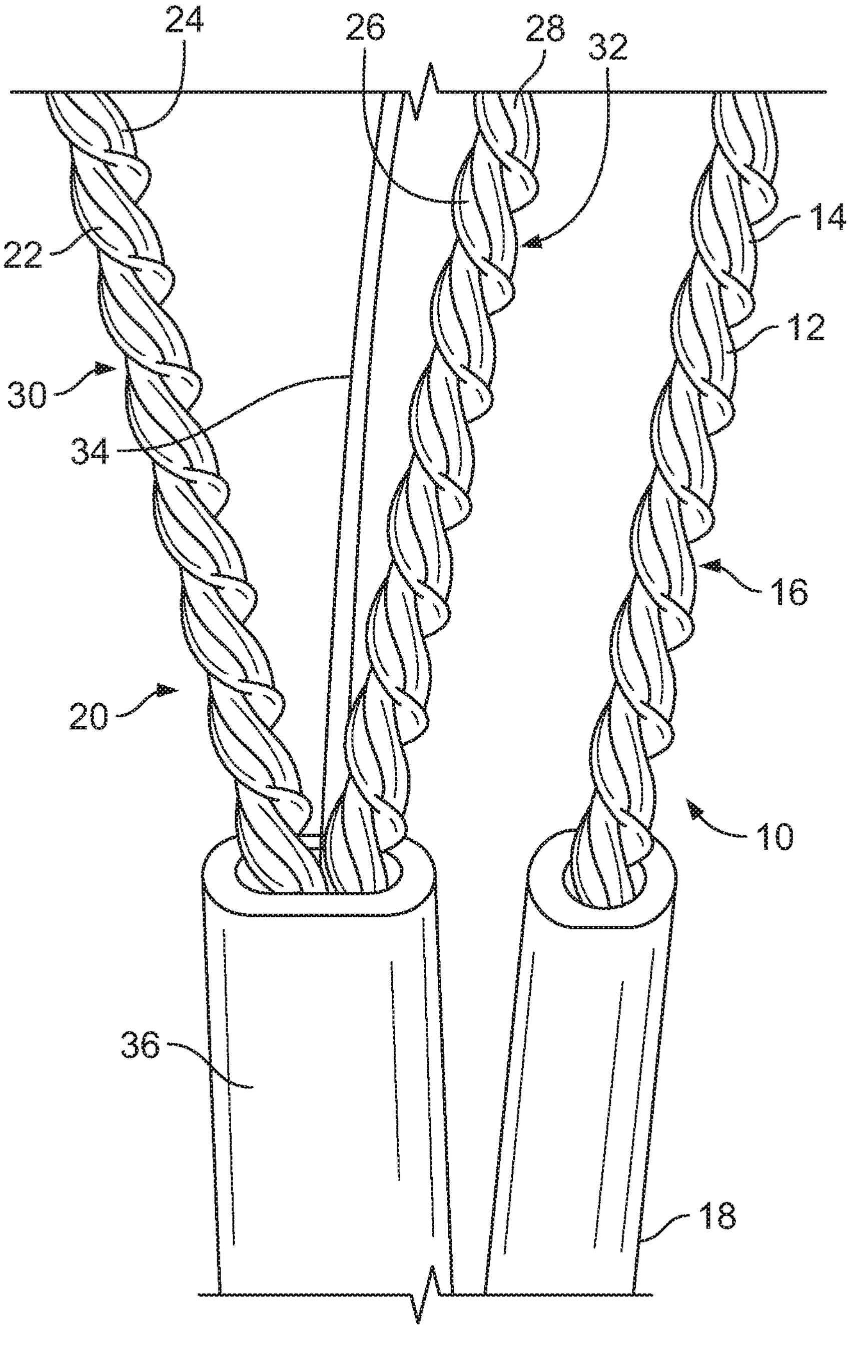
FIG. 1 illustrates example embodiments of cables having single twisted pairs of conductors.

FIG. 1 illustrates two example embodiments of cables containing one or more single twisted pairs of conductors. The first cable 10 includes first and second conductors 12, 14 that are twisted together to form a single twisted pair 16. The conductors 12, 14 are enclosed by a protective jacket 18. The second cable 20 includes first through fourth conductors 22, 24, 26, 28. Conductors 22 and 24 are twisted together to form a first single twisted pair 30, and conductors 26 and 28 are twisted together to form a second single twisted pair 32. The twisted pairs 30 and 32 are separated by a separator 34, and are encased in a protective jacket 36. In certain example embodiments, the cables 10, 20 include a number of twisted pairs greater than two. In certain example embodiments, each single twisted pair of conductors, e.g., 16, 30, 32, is configured for data transmission up to 600 MHz (ffs) and has a current carrying capacity up to 1 A. Each single twisted pair of conductors, e.g., 16, 30, 32, can be connectorized with the various embodiments or combination of embodiments of free connectors and fixed connectors as described herein. The connectorized twisted pairs can be coupled with an adapter as described herein.

Figure 2A:
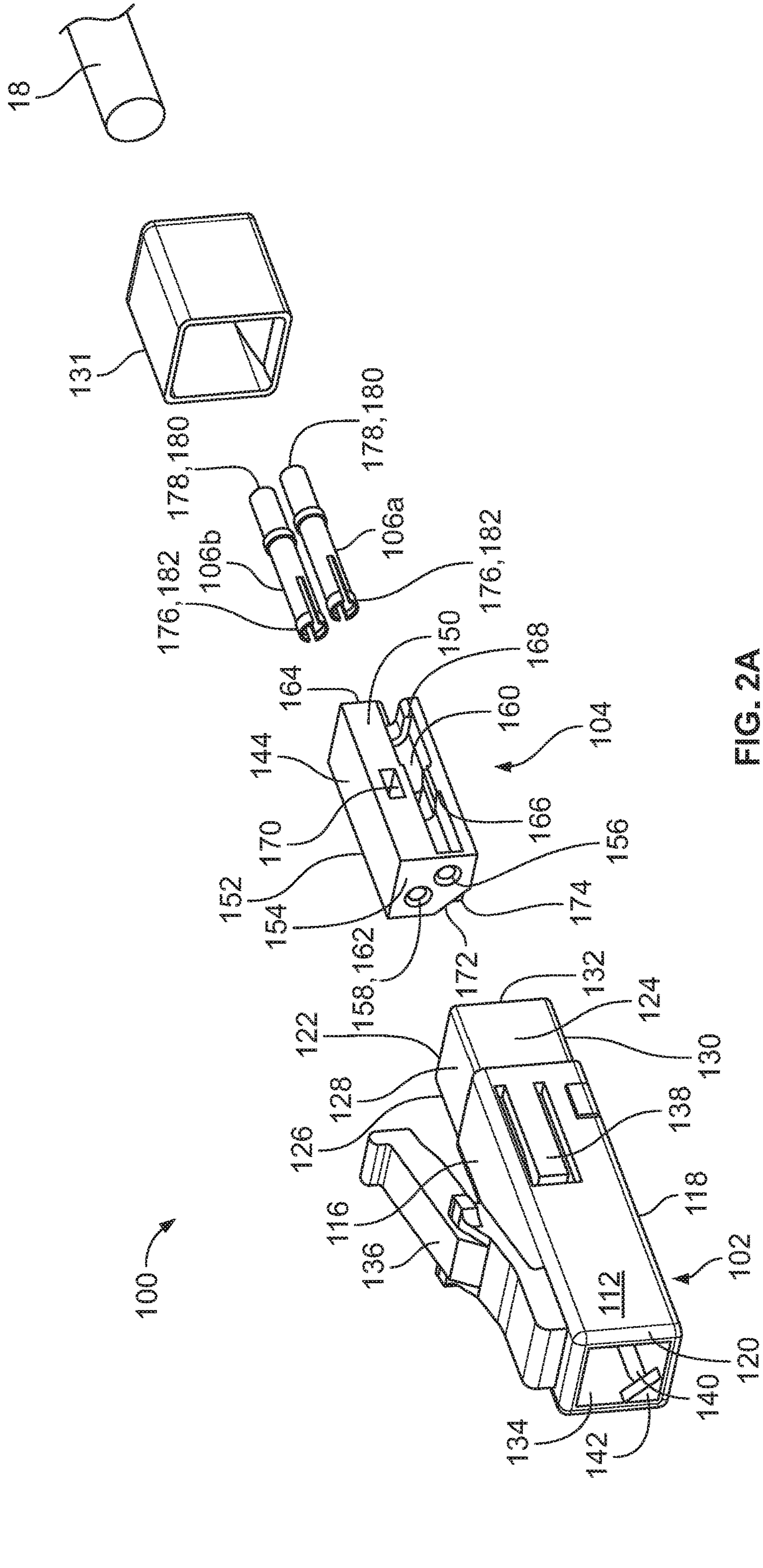
FIGS. 2A and 2B provide a perspective view of an example embodiment of an unassembled and an assembled free connector, respectively.
Figure 2B:
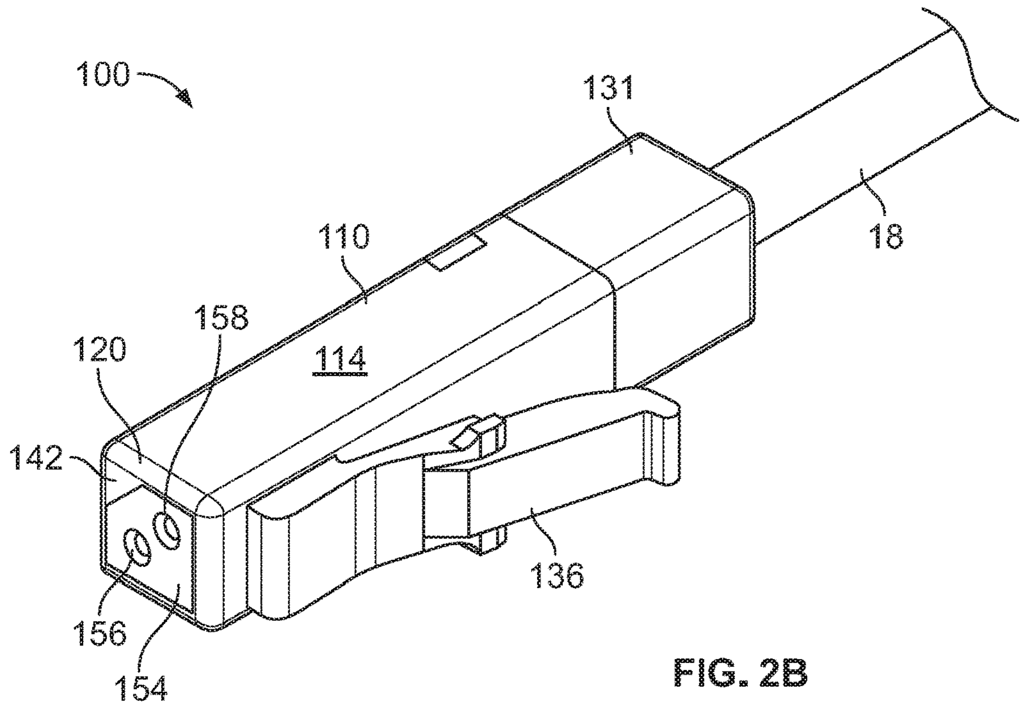

Referring to FIGS. 2A and 2B, an example embodiment of an unassembled and assembled free connector 100, respectively, are illustrated. In certain embodiments, the free connector 100 is in the style of an LC connector that is used with optical fibers. In certain embodiments the free connector 100 can adopt the LC connector footprint, e.g. the shape and size of the LC connector. In certain embodiments, the free connector 100 is of the LC style (e.g. similar in appearance, for example, a small form factor with a substantially square elongate connector body and a snap latch on the connector body) but in a larger or smaller footprint than the LC connector. In certain embodiments, the free connector 100 varies in other dimensions and/or features from the LC connector style and/or footprint.

Figure 3:
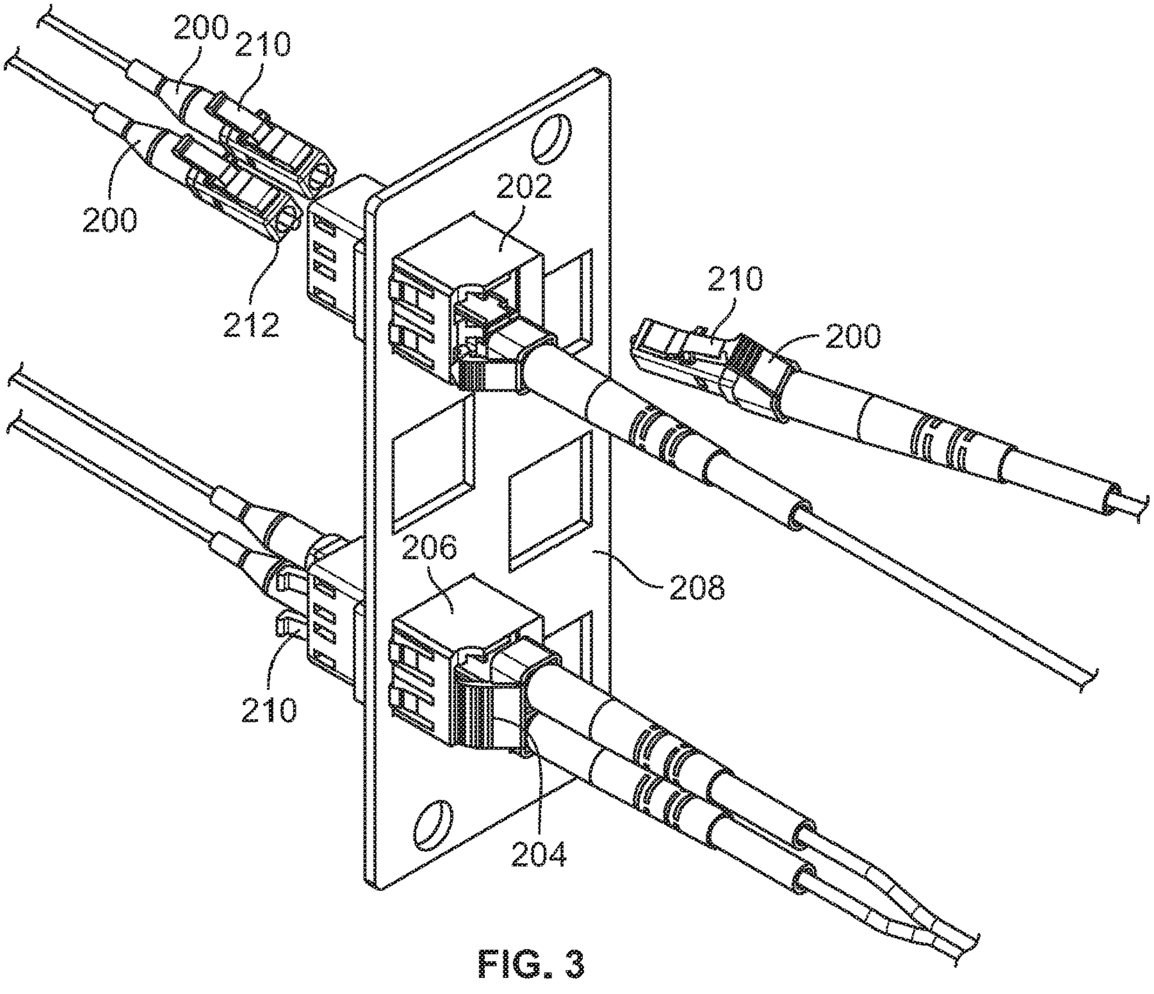
FIG. 3 illustrates an example of LC connectors configured for use with optical fibers.
Figure 4A:
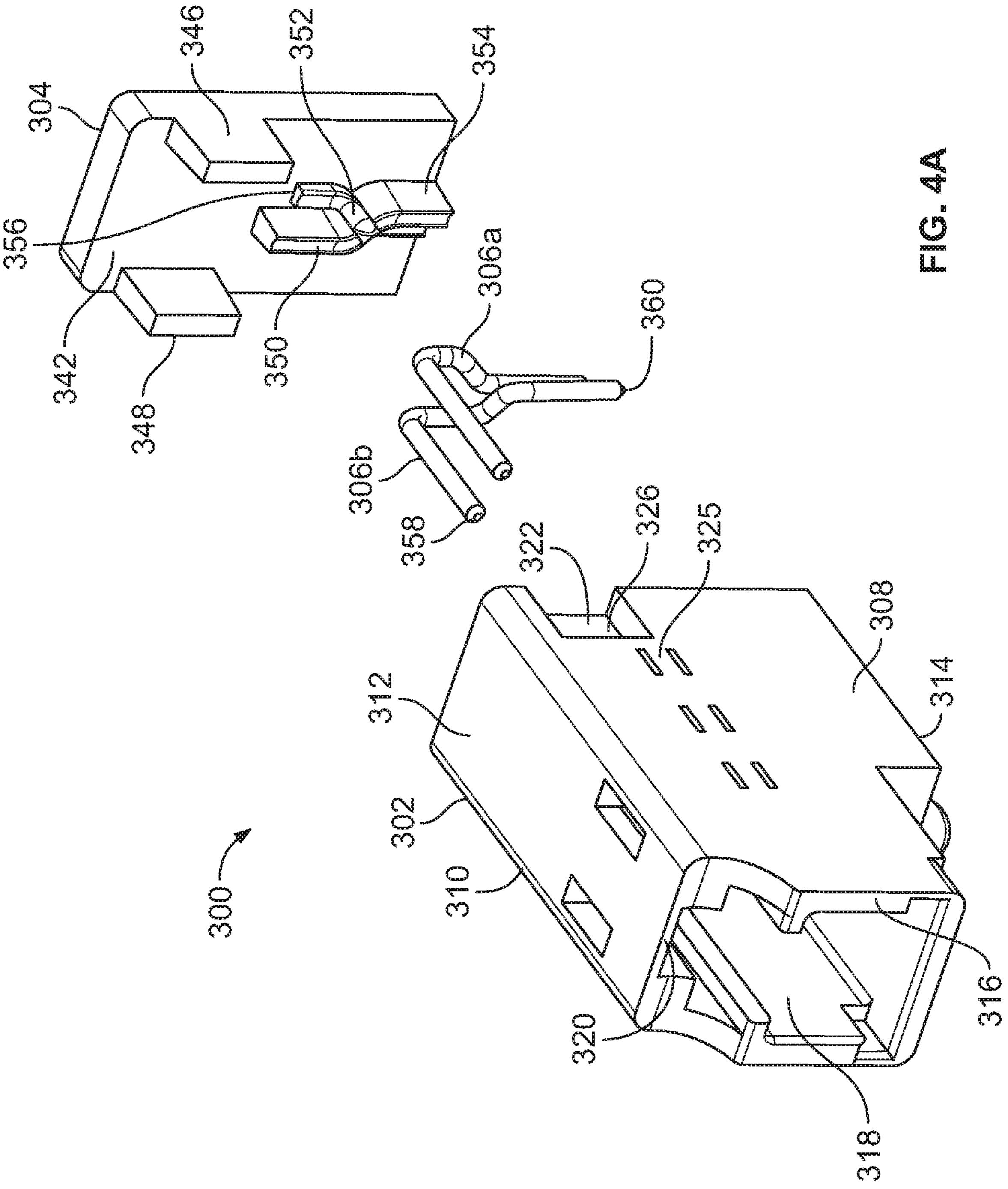
FIGS. 4A-4C provide a forward perspective view of an unassembled fixed connector, a rearward perspective view of the unassembled fixed connector, and a perspective view of an assembled fixed connector, respectively.
Figure 4B:
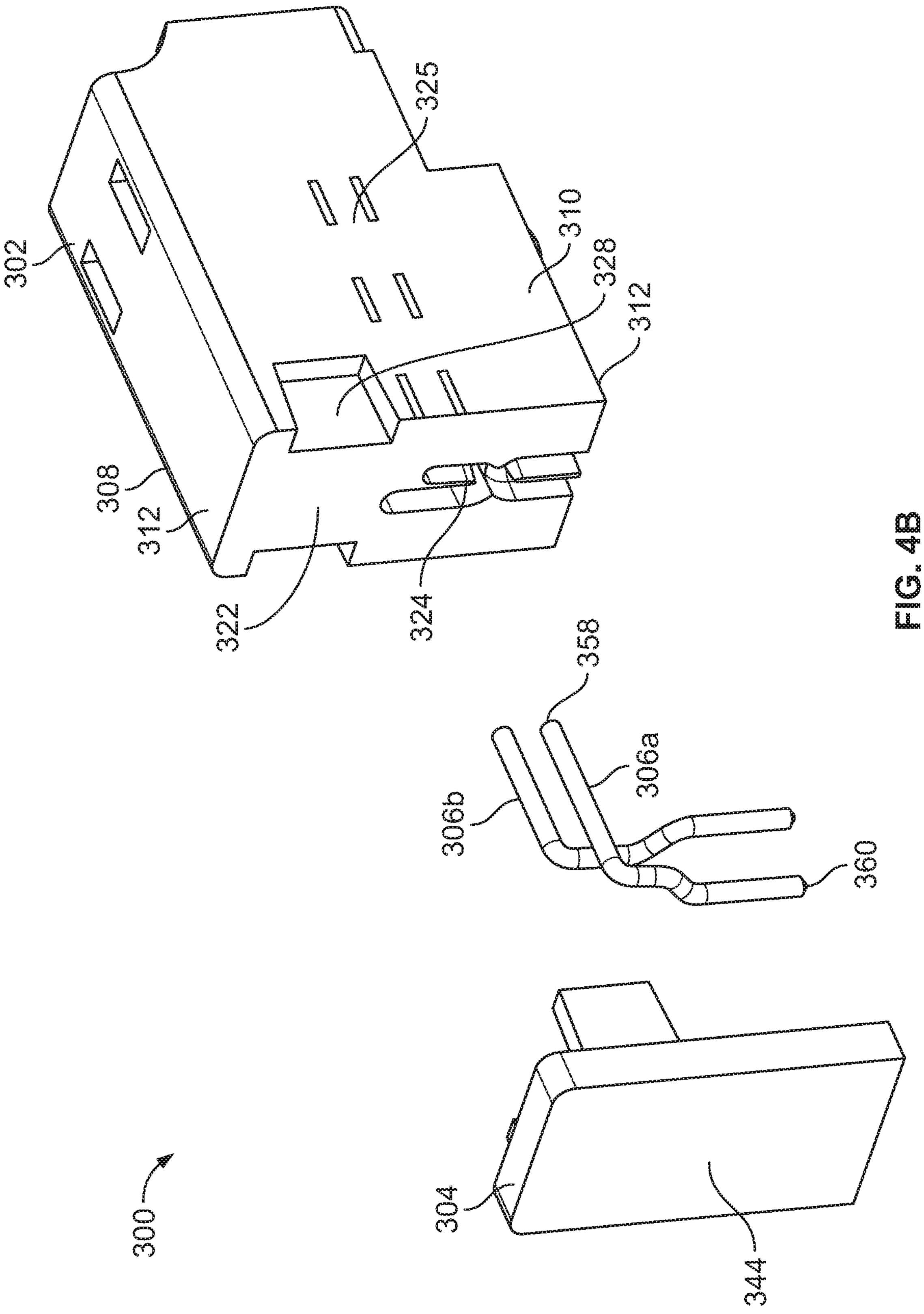
Figure 4C:
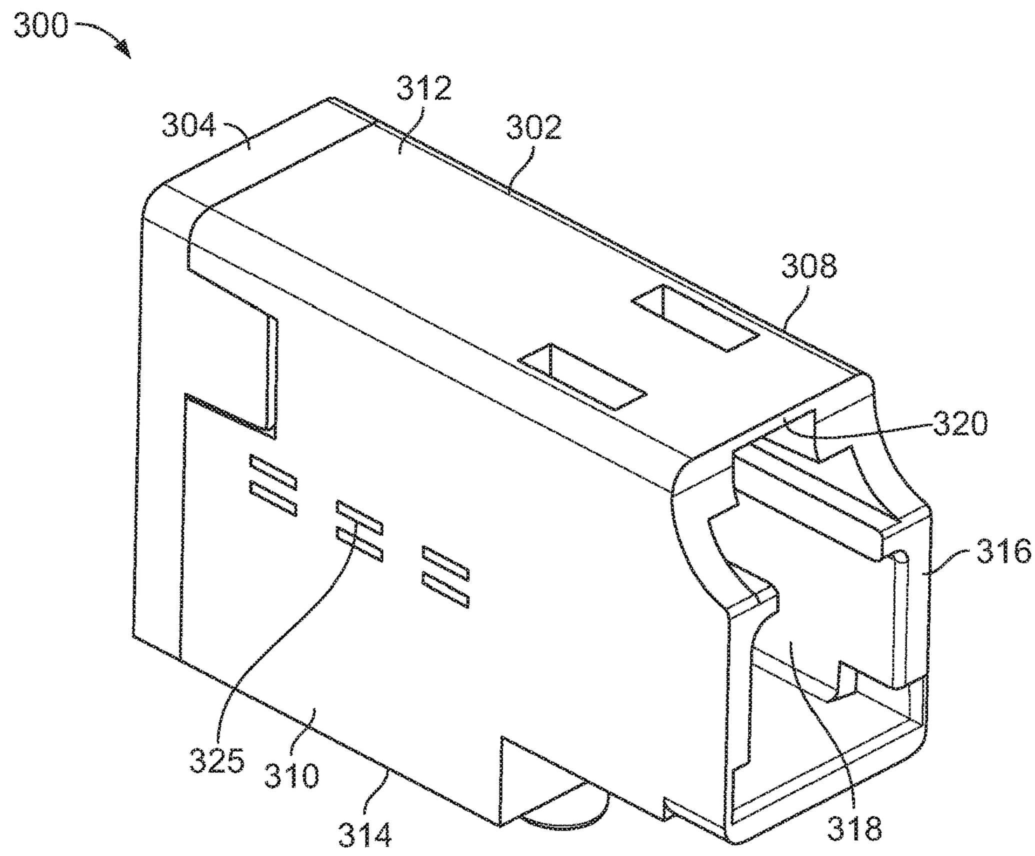

Referring to FIG. 3 an example of a simplex LC connector 200 and adapter 202, as well as a duplex LC connector 204 and adapter 206, are illustrated relative to a panel 208. A snap latch 210 is used to maintain the coupling of a connector to an adapter. The LC family of connectors, adapters and active device receptacles are generally known as small form factor connectors for use with optical fibers (1.25 mm ferrule) in high density applications, e.g., in-building communication systems. A front face 212 of a simplex LC connector is generally square having outer dimensions of 4.42 mm by 4.52 mm. The IEC (International Electrotechnical Commission) standard for an LC connector can be identified as IEC 61754-20; the noted IEC standard is hereby incorporated by reference.

Referring once again to FIGS. 2A and 2B, the free connector 100 generally includes a connector housing 102, a connector insert 104 and a pair of socket contacts 106*a*, 106*b*.

The connector housing 102 of the free connector 100 includes an elongate body portion 110 having first and second side walls 112, 114 connected by upper and lower walls 116, 118, respectively, to establish a square or substantially square forward face 120. The connector housing 102 further includes a rear portion 122 that extends rearward from the elongate body portion 110. The rear portion 122 has side walls 124, 126 connected by upper and lower walls 128, 130, respectively, to establish a square or substantially square rear face 132 of the connector housing 102. The outer dimensions of the rear portion 122 are reduced from the outer dimensions of the elongate body portion 110 to accommodate a rear cover 131 or boot to enclose the rear face 132 of the connector housing 102. In certain embodiments, the rear cover 131 includes a strain-relief feature. A central channel 134 of a consistent or varying cross-section extends through the connector housing 102 from the forward face 120 to the rear face 132. In instances, where the connector housing 102 is varying from the LC style connectors, the exterior and/or interior cross-sections of the connector housing 102 can assume a shape (e.g. round, oval, rectangular, triangular, hexagonal, etc.) that is different from a squared shape.

The connector housing 102 includes a snap latch 136 on the upper wall 116 of the elongate body portion 110. The snap latch 136 can be positioned proximate the forward face 120 of the connector housing 102 as illustrated or can be positioned further rearward along the upper wall 116 as appropriate to enable a releasable interface or coupling with a corresponding fixed connector or adapter, described below. In certain example embodiments, at least one of the side walls 112, 114 includes a cantilevered latch 138 that interfaces with the connector insert 104 to retain the connector insert 104 within the central channel 134 when inserted therein.

In certain example embodiments, the connector housing 102 includes a keying feature that is provided within the central channel 134 to ensure that the connector insert 104 is inserted into the connector housing 102 in a correct orientation. In the example embodiment of FIGS. 2A and 2B, the keying feature comprises a chamfer 140 that extends along a lengthwise portion, or the entire length, of a lower corner of the central channel 134; a complementary keying feature is provided on the connector insert 104, described below.

In certain example embodiments, the connector housing 102 includes a stop feature to help ensure proper forward positioning and/or prevent over-insertion of the connector insert 104. In the example embodiment of FIGS. 2A and 2B, the stop feature includes a solid triangular portion 142 that interfaces with a stop feature of the connector insert 104, described below. The connector housing 102 may be of a unitary configuration and can be manufactured through an appropriate molding process, e.g. insert molding. Other keying and/or stop features may be used without departing from the spirit or scope of the disclosure.

The connector insert 104 includes a body portion 144 having first and second side walls 146, 148 connected by upper and lower walls, 150, 152, respectively. A forward face 154 of the body portion 144 includes two apertures 156, 158 behind which extend first and second channels 160, 162, respectively. The first and second channels 160, 162 extend from the forward face 154 out through a rear face 164. The body portion 144 is configured to be received within the central channel 134 of the connector housing 102 such that the forward face 154 of the body portion 144 is proximate the forward face 120 of the connector housing. In certain examples, when inserted into the connector housing 102, the entirety of the connector insert 104 is maintained within the elongate body portion 110 of the connector housing 102.

In certain examples, each of the first and second channels 160, 162 of the connector insert 104 includes one or more bosses 166 and a lip edge 168 proximate the rear face 164. When the socket contacts 106*a*, 106*b* are inserted in their respective first and second channels 160, 162, each boss 166 operates to position the socket contacts 106*a*, 106*b*, so as to be axially aligned with the apertures 156, 158 of the forward face 154. The boss 166 also operates to establish an interference fit between the socket contacts 106*a*, 106*b* and their respective first and channels 160, 162 to help maintain the socket contacts 106*a*, 106*b* within the first and second channels. The lip edge 168 also aids in positioning each socket contact 106*a*, 106*b*, so as to place each socket contact 106*a*, 106*b* forward most in their respective first and second channels 160, 162 proximate the forward face 154 of the connector insert 104, and to prevent the socket contacts 106*a*, 106*b*, from being pulled rearward out of their respective first and second channels 160, 162 and out of the connector insert 104 itself. Other features and/or elements can also, or alternatively, be used to retain the socket contacts 106*a*, 106*b* within the first and second channels 160, 162 without departing from the spirit of the disclosure.

In certain examples, the apertures 156, 158 and respective first and second channels 160, 162 are stacked vertically or positioned side-by-side horizontally. However, in order to minimize the crosstalk between adjacent contact pairs when a plurality of connectors 100 are deployed near one another, in certain examples, the apertures 156, 158 and respective first and second channels 160, 162 are provided in an offset configuration (see FIGS. 2A and 2B) so as to present the inserted socket contacts 106*a*, 106*b* in a cross-talk neutralizing position relative to the other connectors (e.g. minimize or prevent cross-talk from adjacent connectors to the socket contacts 106*a*, 106*b*).

In certain examples, at least one of the side walls 146, 148 of the connector insert 104 includes a ramped tab 170 that protrudes outwardly therefrom. When inserting the connector insert 104 within the connector housing 102, the ramped tab 170 allows the connector insert 104 to pass the cantilevered latch 138 of the connector housing 102 for full insertion and subsequently engages the cantilevered latch 138 preventing rearward movement or removal of the connector insert 104 from the connector housing 102. Other features and/or elements can also, or alternatively, be used to retain the connector insert 104 within the connector housing 102 without departing from the spirit or scope of the disclosure.

In certain examples, the connector insert 104 includes a keying feature that is configured to interface with the keying feature of the connector housing 102. In the example of FIGS. 2A and 2B, the keying feature comprises a chamfer 172 configured to interface with the chamfer 140 of the connector housing 102. The chamfer 172 can extend along a portion of the connector insert 104 or along a full length of the connector insert 104. The keying feature ensures proper orientation of the connector insert 104 within the connector housing 102.

In certain examples, the connector insert 104 includes a stop feature. In the example of FIGS. 2A and 2B, the stop feature comprises a boss 174 recessed from the forward face 154 of the connector insert 104 and configured to interface with the stop feature of the connector housing 102, e.g., the solid triangular portion 142. The recession of the boss 174 from the forward face 154 enables the forward face 154 of the connector insert 104 to be positioned flush with the stop feature, e.g., the solid triangular portion 142, of the connector housing 102 thereby presenting the combined forward face 154 of the connector insert 104 and the stop feature of the connector housing 102 as a generally unified planar surface. The connector insert 104 may be of a unitary configuration and can be manufactured through an appropriate molding process, e.g. insert molding. Other keying and/or stop features may be used without departing from the spirit or scope of the disclosure.

Each of the socket contacts 106*a*, 106*b* includes a tip contact 176 and a ring contact 178. Each socket contact 106*a*, 106*b* comprises a hollow cylinder having a rear end 180 and a forward end 182. An internal diameter 184 of the rear end 180 of each socket contact 106*a*, 106*b*, can be sized to receive a respective one of the conductors 12, 14 (or 22, 24, or 26, 28, see FIG. 1) of the twisted pair 16 (or 30 or 32, see FIG. 1) extending from the cable 18 (or 36, see FIG. 1). In certain embodiments, the internal diameter 184 is such that an interference fit between conductor 12, 14 and socket contact 106*a*, 106*b* is established to provide a good mechanical and electrical connection. In certain embodiments, the rear end 180 of the socket contacts 106*a*, 106*b* are crimped onto the conductors 12, 14. In certain embodiments, the conductors 12, 14 are soldered to the socket contacts 106*a*, 106*b*. The twist of the twisted pair 16 can be maintained up to the point of the conductors 12, 14 being coupled to the socket contacts 106*a*, 106*b*; the ability to maintain the twist in the conductors 12, 14 helps to minimize or prevent cross-talk from adjacent connectors to the socket contacts 106*a*, 106*b* improving operation of the connector 100. The forward end 182 of each socket contact 106*a*, 106*b* is sized to receive the pin contacts or conductors of a mating connector, e.g. fixed connector 300 described below; and can include one or more longitudinal slits 186.

The free connectors 100 can be configured in a simplex form or combined in a duplex form similar to that available with LC fiber optic connectors (see FIG. 1); forms including more than two free connectors 100 are also possible.

FIGS. 4A-4C and FIG. 5 illustrate example embodiments of fixed connectors 300 that are configured to interface with the free connectors 100. In certain embodiments, the fixed connector 300 is in the style of an LC connector that is used with optical fibers. In certain embodiments the fixed connector 300 can adopt the LC connector footprint, e.g. the shape and size of the LC connector (e.g. the LC adapter or LC active device receptacle). In certain embodiments, the fixed connector 300 is of the LC style but in a larger or smaller footprint than LC connector. In certain embodiments, the fixed connector 300 varies in other dimensions and/or features from the LC connector style and/or footprint.

The fixed connector 300 is a two-piece component comprising a body portion 302 and a rear panel 304; the rear panel 304 enables placement of pin conductors 306*a*, 306*b* within the body portion 302.

The body portion 302 includes first and second side walls 308, 310 connected by upper and lower walls 312, 314. The first and second side walls 308, 310, and the upper and lower walls 312, 314 frame an open forward portion 316 that presents a port 318 within the body portion 302 that is configured to receive the free connector 100. A notch 320 proximate the upper wall 312 is configured to interface with the snap latch 136 to removably retain the free connector 100. A rear plate 322 of the body portion 302 fills that gap between walls 308, 310, 312, 314 save for a pin cavity 324 and pin channels 325 extending therefrom. The pin channels 325 are configured to receive the pin conductors 306*a*, 306*b* while the pin cavity 324 is configured to house the portion of the pin conductors 306*a*, 306*b* not within the pin channels and to interface with the rear panel 304. First and second notches 326, 328 extend through first and second side walls 308, 310, respectively, to the rear plate 322 and are configured to interface with the rear panel 304.

Figure 5:
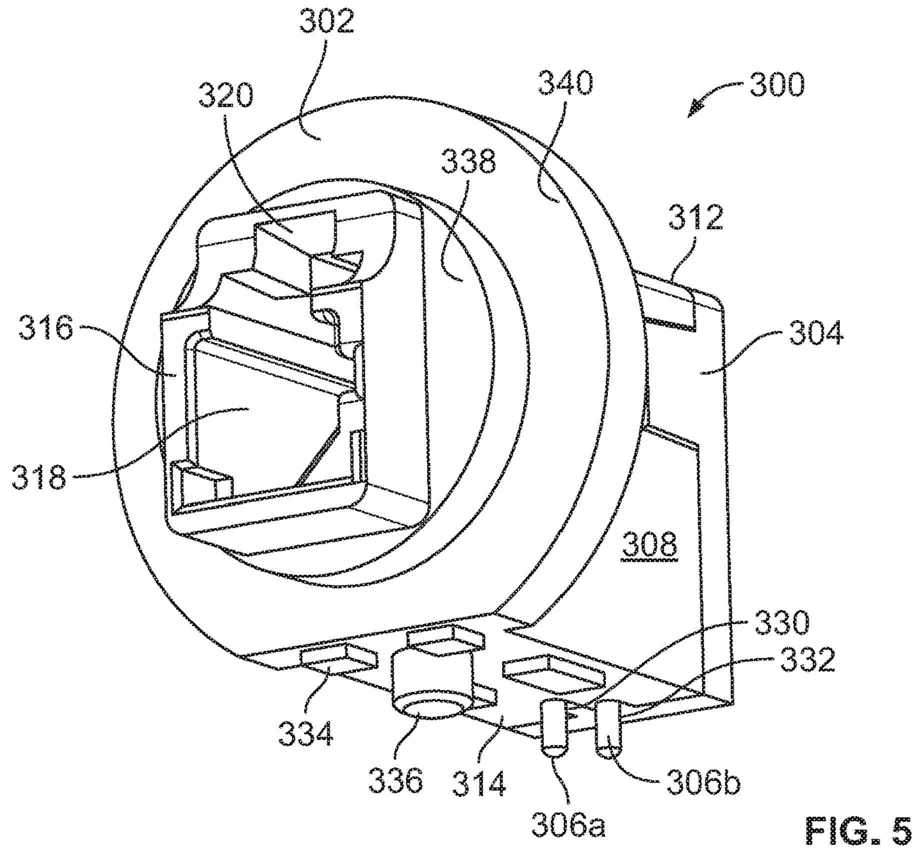
FIG. 5 is a perspective view of an assembled fixed connector with a bulkhead mounting feature.

Referring to FIG. 5, the lower wall 314 of the body portion 302 includes first and second openings 330, 332 through which the pin conductors 306*a*, 306*b* extend when the fixed connector 300 is assembled. One or more stabilizing pads 334 and/or mounting features 336 can also be provided on the lower wall 314 enabling the mounting of the fixed connector 300 and the electrical coupling of the pin conductors 306*a* 306*b* to a circuit board or other circuit structure. FIG. 5 further illustrates that the body portion 302 of the fixed connector can include one or more flanges, e.g. first flange 338 and second flange 340 proximate the open forward portion 316. The flanges 338, 340 are for bulkhead mounting.

The rear panel 304 includes a forward face 342 and a planar rear face 344. The forward face 342 is provided with a pair of forward extending tabs 346, 348 that are configured to interface with the first and second notches 326, 328 to fixedly, or removably, secure the rear panel 304 to the body portion 302 through an interference fit. In certain embodiments, a latching mechanism can be used additionally or alternatively to the interference fit to secure the rear panel 304. The forward face 342 is further provided with a forward extending upper stabilizer 350 curving toward a central location 352 and a forward extending lower stabilizer 354 curving toward the same central location 352. A pin stabilizer 356 is provided to either side of the upper stabilizer 350.

The pin conductors 306*a*, 306*b* each include a first end 358 and a second end 360. Each pin conductor 306*a*, 306*b* is bent to approximate a right angle between the first and second ends 358, 360 so that the first end 358 extends through the rear plate 322 and into the port 318. While within the port 318, the first ends 358 are to be received in the forward end 182 of the socket contacts 106*a*, 106*b* to make an electrical connection therewith when the free connector 100 is inserted into the port 318. The second end 360 of each of the pin conductors 306*a*, 306*b* extends through the lower wall 314. The first ends 358 of the pin conductors 306*a*, 306*b* are arranged to be offset from one another consistent with the offset of the socket contacts 106*a*, 106*b* while that second ends 360 of the pin conductors 306*a*, 306*b* are crossed proximate the right angle bend; the offset and crossing of the pin conductors 306*a*, 306*b* helps to minimize, or prevent, cross-talk between the pin conductors 306*a*, 306*b* and the pin conductors of vertically or horizontally proximate like connectors. In certain embodiments, the pin conductors 306*a*, 306*b* can be stacked horizontally or vertically to correspond to a placement of the socket contacts 106*a*, 106*b*. In certain embodiments, the pin conductors 306*a*, 306*b* are of equivalent lengths while in other embodiments the pin conductors 306*a*, 306*b* are of differing lengths.

Additional information about pin conductors and their positioning to minimize, or prevent, cross-talk can be found in U.S. Pat. No. 9,407,043 entitled "Balanced Pin and Socket Connectors" and U.S. Pat. No. 9,590,339 entitled "High Data Rate Connectors and Cable Assemblies that are Suitable for Harsh Environments and Related Methods and Systems." Each of the noted patents is hereby incorporated by reference.

When assembling the fixed connector 300, the first ends 358 of each of the pin conductors 306*a*, 306*b* are inserted into pin cavity 324, and corresponding pin channels 325, in their offset positions; a divider 362, which comprises a portion of the rear plate 322, separates the second ends 360 of the pin conductors 306*a*, 306*b* within the pin cavity 324. The rear panel 304 is then secured to the body portion 302 of the fixed connector 300. The second ends 360 of the pin conductors 306*a*, 306*b* pass through the central location 352 at the rear panel 304 where the upper and lower stabilizers 350, 354 help maintain/fix the position of the pin conductors 306*a*, 306*b* relative to the body portion 302; the upper and lower stabilizers 350, 354 are received within the pin cavity 324. In certain embodiments, an interference fit occurs between the upper and lower stabilizers 350, 354 and the pin cavity 324 to assist in securing the rear panel 304 to the body portion 302 of the fixed connector 300. The pin stabilizers 356 press against each of the pin conductors 306*a*, 306*b* to ensure that they are fully, forwardly positioned within the pin channels of the fixed connector 300 as well as to maintain/fix their position.

The fixed connectors 300 can be configured in a simplex form or combined in a duplex form similar to that available with LC fiber optic connectors (see FIG. 1); forms including more than two fixed connectors 300 are also possible.

Figure 6:
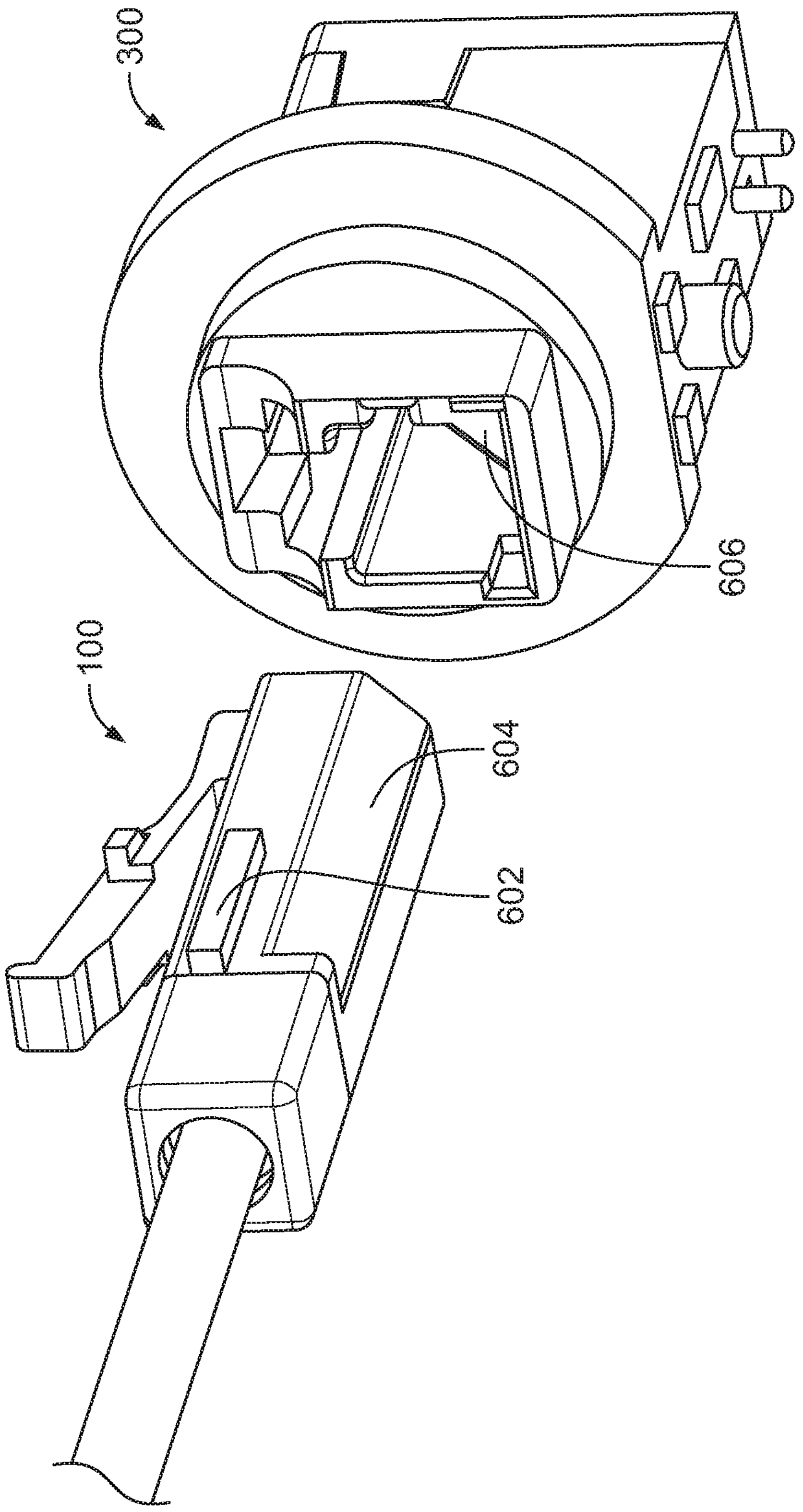
FIG. 6 is a perspective view of an assembled free connector and an assembled fixed connector.

In certain embodiments, when the free connector 100 and/or fixed connector 300 are configured in the LC style and/or footprint, one or both of the connectors 100, 300 can be provided with a blocking feature, to prevent the insertion of the free connector 100 into an actual LC fiber optic adapter or LC fiber optic active device receptacle and/or to prevent an actual LC fiber optic connector from being inserted into the fixed connector 300. In the example of FIG. 6, the free connector 100 is provided with a blocking feature in the form of rectangular protuberance 602 extending outward from the connector housing 102; the protuberance 602 will prevent insertion of the of the free connector 100 into LC fiber optic adapter or LC fiber optic active device receptacle. Further, in the example of FIG. 6, the free connector 100 includes a chamfer 604 along a portion of a corner of the connector housing 102 which is accommodated by a blocking feature in the form of a triangular panel 606 in a corner of the port 318. The triangular panel 606 of the fixed connector 300 allows the free connector 100 to enter the port 318; however, the squared housing configuration of an LC fiber optic connector will be blocked from entering the port 318 of the fixed connector 300.

Figure 7:
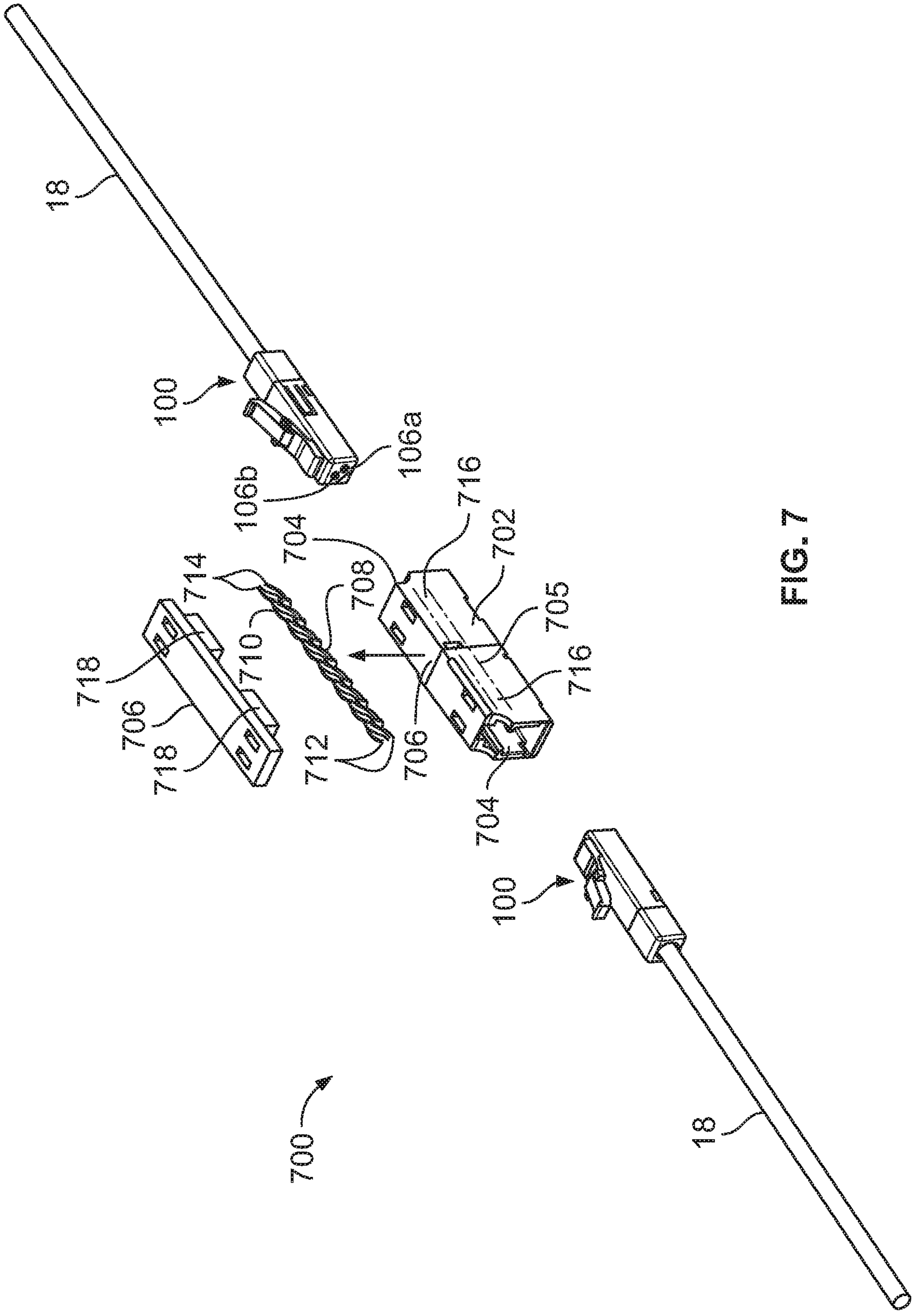
FIG. 7 is a perspective view of an adapter and a pair of cables that have each been connectorized with a free connector.

FIG. 7 illustrates a single twisted pair adapter 700. The adapter 700 is configured to enable an in-line connection between a first free connector 100*a* and a second free connector 100*b*. For example, simplex and/or duplex adapters 700 can be used in wall plate application (similar to standard electrical wall outlet) or a plurality of adapters 700 can be used in a bulkhead configuration for high density applications.

The adapter 700 generally comprises a pair of fixed connectors 300 that are modified to be electrically and mechanically coupled to one another rather than being individually coupled to a circuit board. In certain embodiments, the adapter 700 comprises a two-piece component having a continuous body portion 702 that defines two ports 704 and an upper (or lower) panel 706 that is configured for coupling to the body portion 702. The body portion 702 defines an upper (or lower) channel 705 into which can be placed a single twisted pair of conductors 708, 710 where each has a pin contact first end 712 and a pin contact second end 714 that can be inserted into corresponding pin channels 716 formed in the body portion 702. The upper panel 706 can be configured with various outward extending stabilizing features to help position and/or maintain the position of the pin contacts 712, 714 in an offset orientation corresponding to the socket contacts 106*a*, 106*b* of the free connector 100 that will be received in each of the ports 704. The upper panel 706 can include outward extending tabs 718 or other type of mechanism for coupling the upper panel 706 to the body portion 702.

Figure 8A:
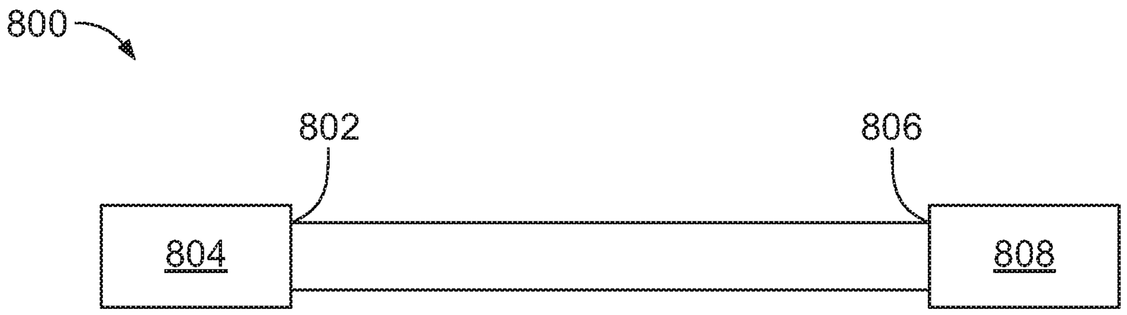
FIGS. 8A-8C illustrate examples of patch cords that can be configured utilizing free connector and modified connectors.
Figure 8B:
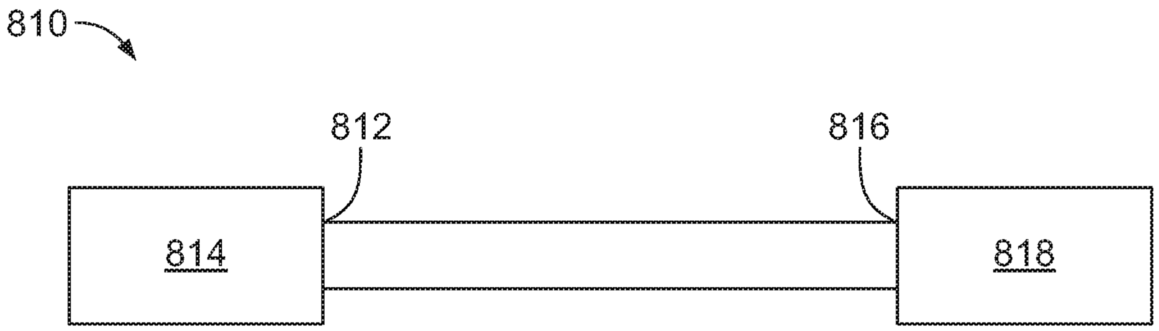
Figure 8C:
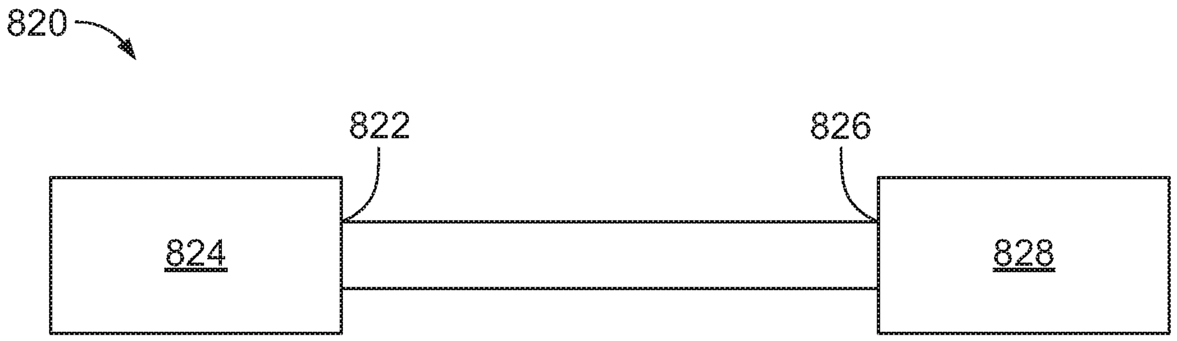

FIGS. 8A-8C illustrate various patch cord configurations that can be manufactured using the free connector 100 and a modified fixed connector 300. In the patch cord examples, the fixed connector 300 is configured for coupling with a cable having a single twisted pair of conductors rather than being configured for coupling to a circuit board. As shown, a patch cord 800 includes a first end 802 with a first free connector 804 and a second end 806 with a second free connector 808, see FIG. 8A. FIG. 8B illustrates a patch cord 810 having a first end 812 with a first free connector 814 and a second end 816 with a first fixed connector 818. FIG. 8C illustrates a patch cord 820 having a first end 822 with a first fixed connector 824 and a second end 826 with a second fixed connector 828.

Figure 9D:
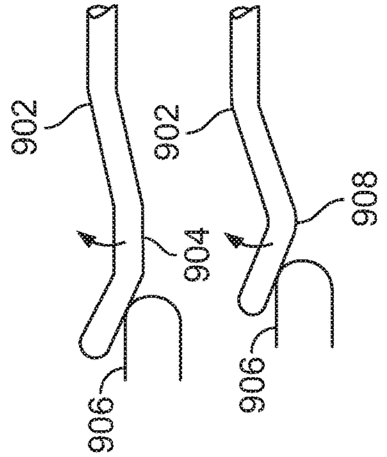
FIGS. 9A-9E illustrate example configurations of socket contacts incorporating a socket spring configuration.
Figure 9E:
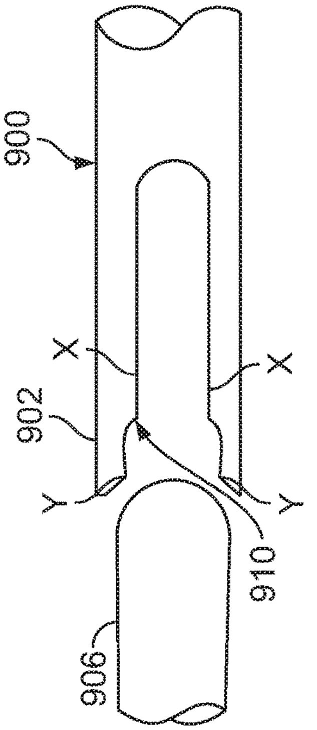
Figure 9A:
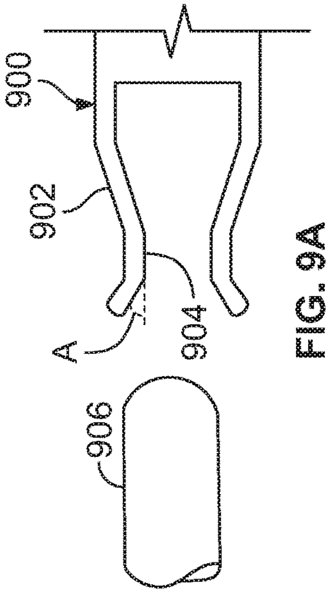
Figure 9B:
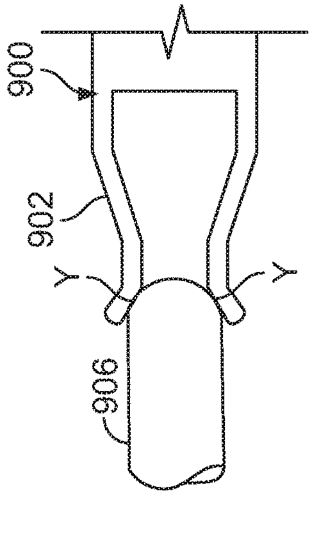
Figure 9C:
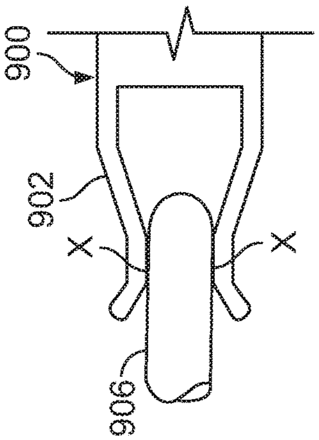

FIGS. 9A-9E illustrate various example embodiments of a socket contact 900 that can be used in the various configurations/embodiments described here, for example, in place of socket 106*a*, 106*b*. As shown in FIGS. 9A-9C, a forward end 902 of the socket contact 900 includes a socket spring configuration that has a leading entry angle, e.g. angle A, and a flat transition 904 such that when a pin 906 is fully mated with the socket contact 900 the final contact point X is in a different location as the insertion/withdrawal point of contact Y. A rearward portion, now shown, of the contact 900 can include a ring contact (e.g., see ring 178 of socket contact 106*a* in FIG. 2A) or other appropriate contact configuration. In certain embodiments, the flat transition 904 is replaced with a rounded transition 908, see FIG. 9D. In certain embodiments, see FIG. 9E, the socket contact 900 is provided with a socket spring configuration wherein the forward end 902 is provided with a stepped surface 910 such that the final mated contact point X of the contact pin 906 is a in a different location as the insertion/withdrawal point Y of the contact pin 906.

It will also be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. It will also be understood that the terms "tip" and "ring" are used to refer to the two conductors of a differential pair and otherwise are not limiting.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A patch cord comprising:

a first connector and a second connector, each comprising:

a connector housing;

a connector body portion that interfaces with the connector housing; and exactly two contacts comprising first and second electrical contacts received within respective first and second channels of the connector body portion, the first and second electrical contacts couplable to first and second electrical conductors;

wherein each of: (a) the first and second electrical conductors; and (b) the first and second electrical contacts transmit both power and data;

wherein each of the exactly two electrical contacts includes a first end and a second end, the first end comprising a pin-receiving end and the second end comprising a conductor-interfacing end;

wherein the pin-receiving end includes a forward spring configuration having a first insertion/withdrawal contact point and a second fully mated contact point such that a pin being received in the pin-receiving end is in contact with only one of the insertion/withdrawal contact point and the second fully mated contact point at a time; and wherein the forward spring configuration is defined by exactly two opposing arms defining a gap therebetween;

a cable having first and second conductors forming a single pair of twisted conductors;

the first and second conductors each having first and second ends;

wherein the first end of the first conductor is electrically coupled to the first contact of the first connector, wherein the first end of the second conductor is electrically coupled to the second contact of the first connector, wherein the second end of the first conductor is electrically coupled to the first contact of the second connector, and wherein the second end of the second conductor is electrically coupled to the second contact of the second connector.

2. The patch cord of claim 1, wherein the connector housing includes an internal keying feature that interfaces with an external keying feature of the connector body portion.

3. The patch cord of claim 1, wherein the connector housing includes an internal stop feature to prevent over insertion of the connector body portion.

4. The patch cord of claim 1, wherein the connector housing includes a blocking feature to prevent insertion of the first and second connectors into an actual LC fiber connector.

5. The patch cord of claim 1, wherein the twisted pair of conductors remain twisted up to being coupled with the first and second electrical contacts.

6. The patch cord of claim 1, wherein the connector body portion includes a tab configured to interface with a cantilevered latch of the connector housing to retain the connector body portion relative to the connector housing.

7. The patch cord of claim 1, wherein the first and second channels of the connector body portion establish an interference fit with the first and second electrical contacts to retain the first and second electrical contacts.

8. The patch cord of claim 1, wherein the forward spring configuration of each of the first and second electrical contacts includes a leading entry angle portion to a subsequent flat transition portion.

9. The patch cord of claim 8, wherein the first insertion/withdrawal contact point occurs on the leading entry angle and the second fully-mated contact point occurs at the flat transition portion.

10. The patch cord of claim 1, wherein the forward spring configuration of each of the first and second electrical contacts includes a leading entry angle portion to a subsequent rounded transition portion.

* * * * *